United States Patent
Blechschmidt

(10) Patent No.: US 7,178,954 B2
(45) Date of Patent: Feb. 20, 2007

(54) SYSTEM AND METHOD FOR GUIDING A PASSENGER IN AN AIRCRAFT CABIN

(75) Inventor: Karl-Heinz Blechschmidt, Apensen (DE)

(73) Assignee: Airbus Deutschland GmbH, Hamburg (DE)

( * ) Notice: Subject to any disclaimer, the term of this patent is extended or adjusted under 35 U.S.C. 154(b) by 116 days.

(21) Appl. No.: 10/884,246

(22) Filed: Jul. 2, 2004

(65) Prior Publication Data
US 2005/0002198 A1    Jan. 6, 2005

(30) Foreign Application Priority Data
Jul. 2, 2003    (DE) ................. 103 29 752

(51) Int. Cl.
*B64D 47/02* (2006.01)
(52) U.S. Cl. ............ 362/471; 362/231; 362/470; 362/479; 362/483; 362/490; 244/118.5; 244/118.6; 244/137.2
(58) Field of Classification Search ............ 362/470, 362/472, 479, 483, 231, 471, 490; 244/118.5, 244/118.6, 137.2
See application file for complete search history.

(56) References Cited
U.S. PATENT DOCUMENTS
4,029,994 A    6/1977    Iwans

| | | |
|---|---|---|
| 6,276,634 B1 | 8/2001 | Bodle |
| 6,578,795 B2 | 6/2003 | Romca et al. |
| 2004/0090787 A1* | 5/2004 | Dowling et al. ............ 362/464 |
| 2004/0141329 A1* | 7/2004 | Fleischmann et al. ...... 362/470 |

FOREIGN PATENT DOCUMENTS

DE    10052594    9/2001

* cited by examiner

*Primary Examiner*—Stephen F Husar
*Assistant Examiner*—Meghan K. Dunwiddie
(74) *Attorney, Agent, or Firm*—W. F. Fasse; W. G. Fasse

(57) ABSTRACT

To guide a passenger to the general location of his assigned seat in an aircraft cabin, the cabin is divided into several cabin zones that are individually identified by different colors of illumination, for example a yellow cabin zone, a red cabin zone and a blue cabin zone. Each service class can correspond to one cabin zone or encompass plural cabin zones. Lighting devices arranged in the cabin are activated to provide illuminating light having the appropriate allocated illumination color in each respective cabin zone. The lighting devices are preferably ceiling lights, sidewall lights, and/or window funnel lights, controlled from a flight attendant panel via a lighting controller. A passenger ticket displays the passenger's assigned seat number and letter, and also the color of the cabin zone in which the assigned seat is located.

19 Claims, 2 Drawing Sheets

SYSTEM AND METHOD FOR GUIDING A PASSENGER IN AN AIRCRAFT CABIN

PRIORITY CLAIM

This application is based on and claims the priority under 35 U.S.C. §119 of German Patent Application 103 29 752.9, filed on Jul. 2, 2003, the entire disclosure of which is incorporated herein by reference.

FIELD OF THE INVENTION

The invention relates to a system as well as a method for guiding or orienting a passenger in a passenger cabin of an aircraft, and particularly for assisting a passenger to find his or her assigned seat in the passenger cabin.

BACKGROUND INFORMATION

It has long been known to identify the passenger seats in a passenger cabin of an aircraft with seat identifying indicia, such as a seat row number and a seat letter, whereby these numbers and letters are arranged consecutively in a regular pattern along the rows of passenger seats. Nonetheless, it is often difficult for passengers to find their assigned seats, by matching the seat identifying indicia provided on their passenger tickets with corresponding indicia provided on the seats and/or other locations in the passenger cabin. This is especially true in wide body aircraft or other high-capacity aircraft having rather large passenger cabins. The seat identifying indicia provided on the seats or at other locations in the cabin, e.g. on the overhead baggage compartments or on the passenger service units above the respective seats, are often not easily visible or findable by the passengers during boarding, especially for passengers who are not familiar with the seat numbering system in general or in a particular aircraft type. As a result, the passengers suffer an inconvenience. Also a substantial loss of time or delay arises during the boarding and seating of the passengers in the aircraft.

To facilitate the boarding process and assist passengers in finding their seats, U.S. Pat. No. 6,578,795 (Romca et al.) discloses an arrangement of seat row indicators and seat location indicators (e.g. bearing row numbers and seat letters) provided on passenger seats in an aircraft cabin, wherein the seat row and location indicators may be illuminated. The row and location indicators of seats in an individual emergency exit row can be illuminated with a color different from the row and location indicators of seats that are not in an emergency exit row, in order to help locate and identify the emergency exit in the event of an emergency requiring evacuation of the aircraft.

SUMMARY OF THE INVENTION

In view of the above, it is an object of the invention to provide a system as well as a method by which it becomes easier for a passenger to find his or her assigned seat in an aircraft passenger cabin. More particularly, it is another object of the invention to divide the passenger cabin into several zones in an easily visible manner, so as to provide a coarse localization of a passenger's assigned seat location, which will assist a passenger to quickly progress to the general area of his or her assigned seat. The invention further aims to avoid or overcome the disadvantages of the prior art, and to achieve additional advantages, as apparent from the present specification. Achieving these objects is, however, not a required limitation of the present invention.

The above objects have been achieved according to the invention in an aircraft having a passenger cabin with plural passenger seats arranged in successive seat rows therein. In the inventive system for assisting a passenger to find his or her assigned seat, the passenger cabin includes plural cabin zones that are respectively identified by different colors of illumination. In other words, different colors of illumination are assigned respectively to the several cabin zones. Each of these zones includes plural rows of the passenger seats. The inventive system further comprises lighting devices that are respectively allocated to and arranged in the several cabin zones, and that are adapted to introduce visible illuminating light having the respective different colors of illumination respectively into the several cabin zones.

Thus, each cabin zone of several seat rows is identified in a readily apparent manner, by being illuminated with a particular color of illumination that is assigned to that respective cabin zone. For example, the cabin may be divided into a yellow zone, a red zone, a purple zone, a blue zone, a green zone, etc., whereby each of these zones is illuminated, at least partially, by the corresponding assigned color of light.

In addition to the identifying indicia (e.g. the seat row number and seat letter) of his or her assigned seat, each passenger is also informed of the color of the zone in which his or her assigned seat is located. For example, a passenger ticket (inclusive of a boarding pass or the like) issued to the passenger displays both the seat identifying indicia as well as the zone color. In this regard, the zone color can be identified on the passenger ticket by the printed text name of the color, or by displaying a color field of the respective color, or by being printed with an ink having the color corresponding to the assigned zone color, or the like. In any event, the passenger thus knows in which zone he or she will find the assigned seat.

When the passenger boards the aircraft, he or she readily recognizes the different cabin zones by the different colors of illumination thereof, and can thus ignore the zones of a color different from the assigned zone color indicated on the passenger ticket. Thus, the passenger can quickly proceed to the proper assigned cabin zone based on the assigned zone illumination color thereof, and then can search for his or her particular assigned seat within the general locality of the color zone. To facilitate the final search for a particular seat, a flight attendant is preferably stationed in each cabin zone to assist passengers regarding the particular seat locations within that zone.

In one embodiment of the invention, the several cabin zones correspond directly one-to-one with the service classes, such as first class, business class, and coach or economy class. Thus, the first class cabin or cabin section corresponds to a first cabin zone illuminated with a first color, the business class cabin or cabin section corresponds to a second cabin zone illuminated with a second color, and the coach class cabin or cabin section corresponds to a third cabin zone illuminated with a third color. In an alternative embodiment, a respective service class is divided into more than one cabin zone, for example two differently colored cabin zones both within the coach service class. By providing smaller cabin zones, it is made easier for a passenger to find a particular assigned passenger seat.

The illumination of the different cabin zones with respective different colors of illumination is preferably achieved entirely under software control through the cabin lighting control system, e.g. by appropriate input selections entered on a flight attendant panel. Thus, the allocation of illumination colors is not fixed and permanent in relation to the particular associated zones. To the contrary, the selected color for any given zone, the size of any given zone (e.g. the number of seat rows included in the zone), the location or boundaries of any given zone (e.g. the range of seat rows included in the zone), etc. can be selected and changed as required simply by making the appropriate input selections or software changes in the cabin lighting control system. There is no need to change the installed hardware simply to achieve a different allocation of colors to zones, or a different number of zones, or different dividing lines between successive zones, or the like.

This is achieved by the cabin lighting devices that selectively generate or emit different colors of illumination as desired, under the control of the cabin lighting controller. For example, the lighting devices comprise fluorescent light tubes with different colored filters, or different colored light emitting diodes. The cabin lighting controller appropriately activates the light sources for providing the allocated color or colors of illumination in each respective cabin zone. In this regard, some colors of illumination can be achieved by blending or mixing the light output of differently colored light sources, e.g. red, green and blue light emitting diodes.

The lighting devices used according to the invention for illuminating the cabin zones with the respective assigned zone colors may include, according to different embodiments, sidewall lights or lighting strips that extend longitudinally along and between the cabin sidewall and the overhead baggage compartments, window funnel lights arranged in or on the window trim funnels, and/or cabin ceiling lights extending longitudinally along and between the overhead baggage compartments and the ceiling trim panels. It is especially preferred to arrange a multi-colored LED light strip in each window trim funnel, so that the window trim funnel can be illuminated with essentially any desired color of illumination, through appropriate control of the several different colors of LEDs.

BRIEF DESCRIPTION OF THE DRAWINGS

In order that the invention may be clearly understood, it will now be described in connection with example embodiments thereof, with reference to the accompanying drawings, wherein.

DETAILED DESCRIPTION OF PREFERRED EXAMPLE EMBODIMENTS AND OF THE BEST MODE OF THE INVENTION

Figure 1:
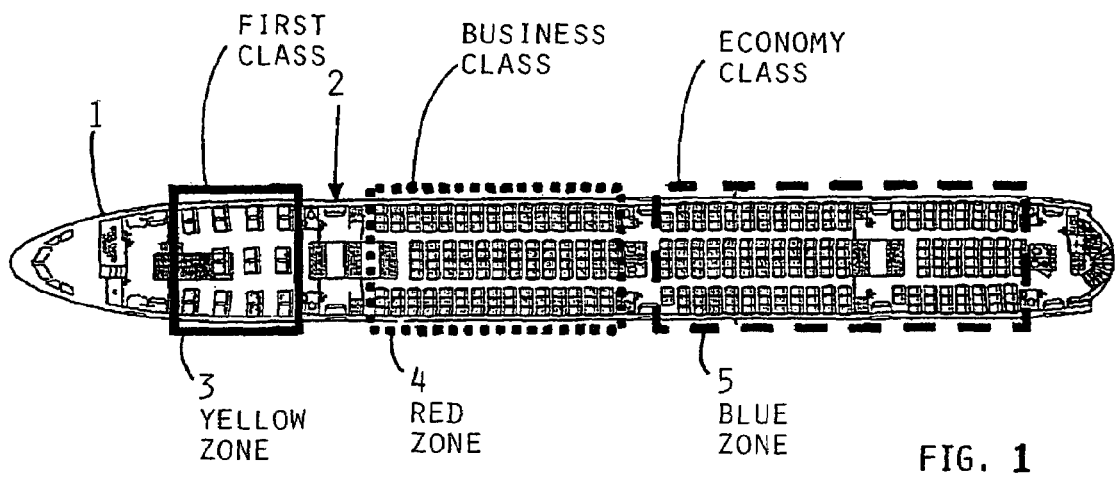
FIG. 1 is a schematic plan view of the cabin layout of an aircraft cabin divided into three service classes and three corresponding colored cabin zones respectively achieved with different colors of illuminating light.

According to a first example embodiment of the invention as shown in FIG. 1, the passenger cabin 2 of an aircraft 1 is divided into three service classes, namely first class, business class, and economy class. Each of these service classes is a section or area of the overall passenger cabin 2, and encompasses plural rows of passenger seats. As is conventionally known, the different service classes are associated with different seat pitches and/or widths, different passenger entertainment options, different meal and beverage options, and generally different levels of passenger service. According to the invention, the passenger cabin 2 is also divided into three different cabin zones, namely a yellow zone 3, a red zone 4, and a blue zone 5, which are each respectively identified by an associated unique color of illuminating light. Thus, the yellow zone 3 is identified by yellow illumination in this zone, the red zone 4 is identified by red illumination in this zone, and the blue zone 5 is identified by blue illumination in this zone. The colored illumination is provided so as to be easily apparent and identifiable for passengers walking along the aisles and/or seated in the passenger seats in the respective zones. Details of the cabin illumination are explained below.

In the embodiment of FIG. 1, each service class, e.g. first class, business class, and economy class, corresponds on a one-to-one basis with a respective one of the colored cabin zones. Thus, the first class area corresponds to the yellow zone 3, the business class area corresponds to the red zone 4, and the economy class area corresponds to the blue zone 5.

Figure 2:
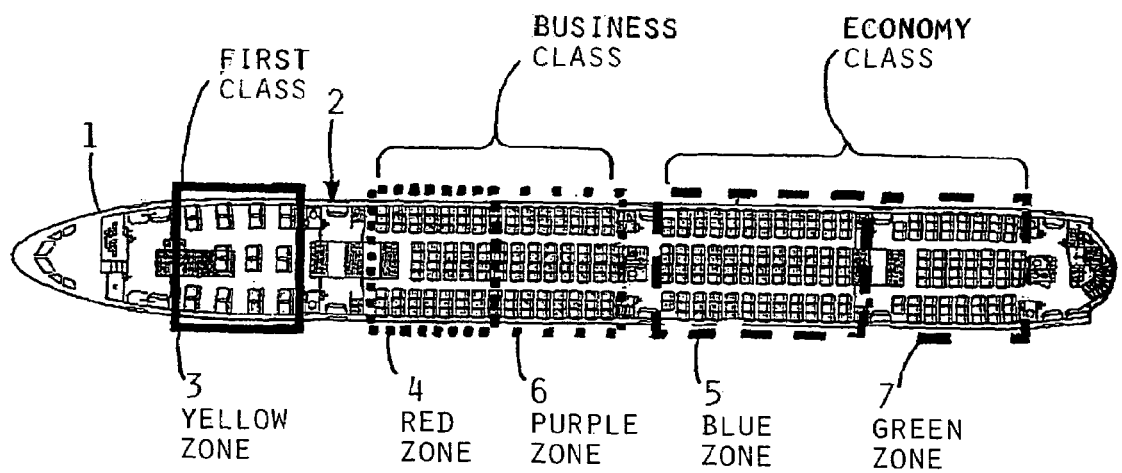
FIG. 2 is a schematic plan view similar to FIG. 1, but showing an embodiment in which the three service classes are divided into five colored cabin zones respectively achieved with different colors of illuminating light.

Alternatively, as shown in the example embodiment of FIG. 2, any given service class can be divided into more than one colored cabin zone. For example, while the first class corresponds to the single yellow zone 3, the business class includes the red zone 4 and a purple zone 6, and the economy class includes the blue zone 5 and a green zone 7. This finer or smaller division of the overall passenger cabin 2 into a greater number of differently colored cabin zones makes it even easier for passengers to find their assigned seats.

Figure 3:
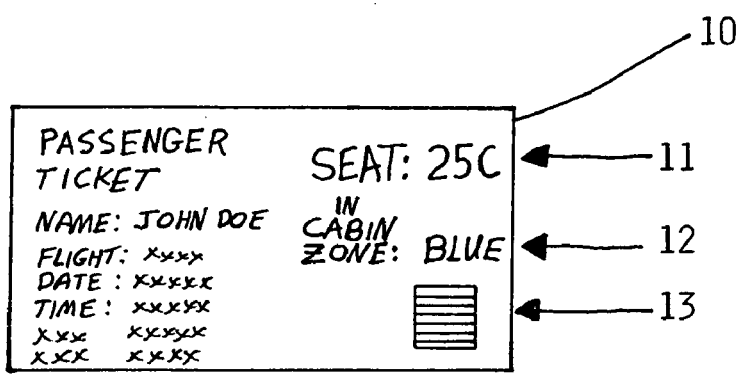
FIG. 3 is a schematic illustration of a passenger ticket identifying the seat as well as the associated cabin zone.

In order that the different illumination colors of the cabin zones help to guide the passengers to their assigned seats, each passenger is informed of the cabin zone color in which his or her assigned seat is located. For example, this is carried out via the passenger ticket 10 as schematically represented in FIG. 3. In the usual manner, the passenger ticket identifies the passenger by name, the flight number, date, time, etc., as well as service class and fee information and the like. Also, the passenger ticket 10 identifies the assigned seat, for example by displaying seat identifying indicia 11 such as a seat row number and seat letter designator. Additionally, according to the invention, the passenger ticket 10 identifies the color of the cabin zone in which the assigned seat is located. This is achieved by printing the text name 12 of the allocated cabin zone color and/or by displaying the color itself, for example in a color field 13 (lined for blue in FIG. 3 as an example). Particularly, in this example, the passenger holding the passenger ticket 10 has been assigned seat 25C in the blue cabin zone 5.

To expedite and facilitate boarding of the aircraft 1, the airline operating the aircraft 1 will carry out the boarding process in a zone-by-zone manner, for example by allowing passengers to board successively according to the cabin zones in which their assigned passenger seats are located. As an example, the aircraft with the cabin layout shown in FIG. 2 might be boarded first by passengers in the green zone, followed by the blue zone, and then the purple zone, etc. Also, different boarding gates and jetways accessing different doors of the aircraft may be used to board the different colored zones. Thereby, the color allocations make it easier for passengers to find the proper boarding gate or jetway.

In any event, the passenger holding the exemplary passenger ticket 10 shown in FIG. 3 will board at the appropriate time and/or the appropriate gate or jetway for the blue cabin zone 5. Upon entering the passenger cabin 2 of the aircraft 1, this passenger can quickly move through the other cabin zones (without looking for his seat) and proceed directly to the blue zone 5, because he knows his seat 25C is located in the blue zone 5. Once in the blue zone 5, the passenger will commence a more detailed search for row 25 and seat 25C within row 25. For this final search the passenger may be assisted by a flight attendant stationed in the blue zone for this purpose.

Figure 4:
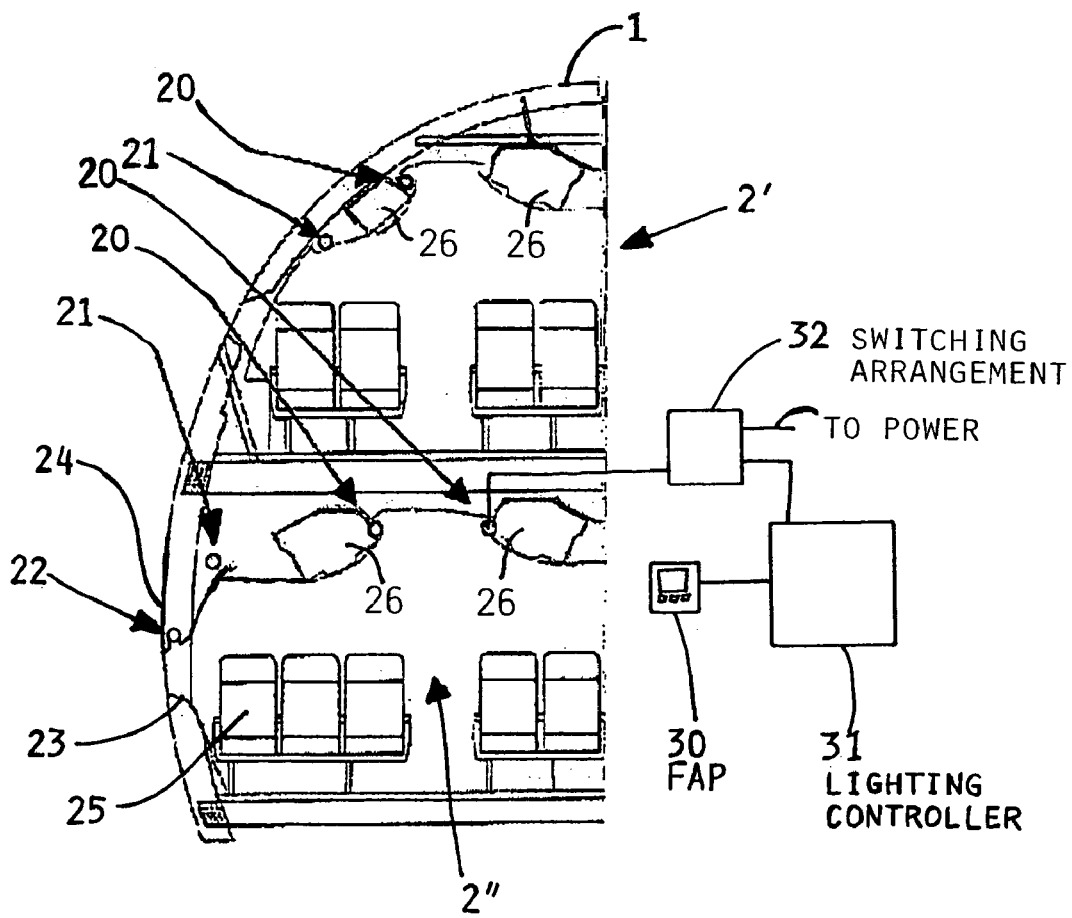
FIG. 4 is a schematic sectional view through half of an aircraft cabin showing the lighting devices and the control arrangement for illuminating the different cabin zones with different colors of illuminating light.

FIG. 4 is a schematic sectional view through half of an aircraft 1 having an upper deck passenger cabin 2' and a lower deck passenger cabin 2". Both of these cabins 2' and 2" can be embodied with the inventive system, namely each of these cabins is divided into several cabin zones respectively having different colors. As is typical, each cabin 2' and 2" is outfitted with passenger seats 25 arranged in successive rows, as well as overhead baggage compartments 26. The sides of each cabin 2' and 2" are bounded by fuselage sidewalls 25, having windows therein surrounded by window trim funnels 23.

The cabins 2' and 2" are illuminated by various lighting devices, including ceiling lights 20, sidewall lights 21, and window funnel lights 22. The ceiling lights 20 extend longitudinally along the ceiling, and particularly between the overhead baggage compartments 26 and the lateral edges of the ceiling trim panels.

Thereby, the ceiling lights 20 illuminate the ceiling trim panels so as to reflect general overhead illumination into the cabin. The sidewall lights 21 extend longitudinally along the upper edge of each sidewall 24, and particularly between the sidewall 24 and the overhead baggage compartments 26. Thereby, the sidewall lights 21 illuminate the sidewalls 24 to spread and reflect general illumination into the cabin. The window funnel lights 22 are arranged, for example, in a recess or pocket at the top of each window trim funnel 23, to thereby illuminate the window trim funnel 23 and reflect illuminating light into the cabin.

Any of the lighting devices 20, 21 or 22 may provide general "white" cabin illumination, or may provide colored illumination for identifying the particular colored cabin zone. In other words, for example, the overhead ceiling lights 20 may provide general white cabin illumination, while the sidewall lights 21 and the window funnel lights 22 may provide the colored illumination for the particular cabin zone. Moreover, any or all of the lighting devices may be activated selectively to introduce either white general illumination light or the appropriate colored light into the cabin, depending on the selected lighting mode.

Preferably, one or more of the lighting devices 20, 21 and/or 22 each include multi-colored light sources, such as light emitting diodes of several different emission colors (e.g. red, green, blue), so that proper activation of the various individual light sources can generate any desired overall illumination color (by mixing or blending of the emitted light). Alternatively, any one or more of the lighting devices 20, 21 and/or 22 may be embodied to generate only a particular color of illumination that is associated with the particular colored cabin zone.

The activation of the lighting devices 20, 21 and/or 22 to achieve the differentiated colored illumination of the several individual cabin zones is carried out through a control arrangement as follows. A switching arrangement 32 is connected respectively to each lighting device 20, 21 or 22 (this may be embodied via an aircraft cabin databus), and is adapted to selectively connect or disconnect the respective lighting device to an aircraft electrical power net. The switching arrangement 32 is controlled by a lighting controller 31, which stores and executes software to carry out any selected one of various different lighting scenarios or modes, at least one of which provides the differently colored illumination for the respective cabin zones, for example the lighting scenario for a boarding situation. The respective desired lighting scenario or any other individual lighting control inputs can be selected and input by a flight attendant or other crew personnel via a flight attendant panel (FAP) 30 connected to the lighting controller 31.

Thus, a flight attendant merely needs to activate an automatic lighting control program or to particularly select the boarding scenario via the flight attendant panel 30, in order to illuminate the several individual cabin zones with the respective associated illumination colors. For example, the sidewall lights 21 and the window funnel lights 22 in the yellow zone 3 will be activated to provide yellow illuminating light, these lighting devices 21 and 22 in the red zone 4 will be activated to provide red illuminating light, these lighting devices 21 and 22 in the blue zone 5 will be activated to provide blue illuminating light, and so forth. Meanwhile, the ceiling lights 20 may be activated to provide white light for general cabin illumination. A passenger boarding the plane will readily and easily recognize the distinct cabin zones by the distinct colors of illumination on the sidewalls 24 and the window funnels 23.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims.

What is claimed is:

1. An aircraft comprising:
   a passenger cabin that has plural seat rows of passenger seats therein, and that includes a first cabin zone containing a first plurality of said seat rows, a second cabin zone containing a second plurality of said seat rows, and a third cabin zone containing a third plurality of seat rows;
   first lighting devices that are arranged in said first cabin zone and that introduce into said first cabin zone illuminating light of a first color;
   second lighting devices that are arranged in said second cabin zone and that introduce into said second cabin zone illuminating light of a second color different from said first color; and
   third lighting devices that are arranged in said third cabin zone and that introduce into said third cabin zone illuminating light of a third color different from said first color and said second color;
   wherein said first, second and third lighting devices are one of ceiling lights, sidewall lights, and window funnel lights.

2. The aircraft according to claim 1, further comprising a lighting control arrangement containing and executing software that defines plural lighting scenarios including a color zone scenario that assigns said first color to said first cabin zone, said second color to said second cabin zone and said third color to said third cabin zone, wherein said lighting control arrangement is connected to said lighting devices and controls said lighting devices according to said color zone scenario so that said first lighting devices introduce said illuminating light of said first color into said first cabin zone, said second lighting devices introduce said illuminating light of said second color into said second cabin zone, and said third lighting devices introduce said illuminating light of said third color into said third cabin zone.

3. A method of assisting a passenger to find a respective assigned seat that is assigned to the passenger among plural passenger seats arranged in a passenger cabin of an aircraft, said method comprising:
   a) providing in said passenger cabin plural cabin zones that are identified by respective different colors of illumination allocated respectively to said zones, by introducing illuminating light having said different colors of illumination respectively into said cabin zones, so that each one of said cabin zones is identified by a respective unique one of said different colors of illumination;
   b) assigning to a passenger a respective assigned seat among said passenger seats in said passenger cabin;
   c) informing said passenger of a unique identifier of said assigned seat; and
   d) informing said passenger of an allocated one of said different colors that is allocated to the one of said cabin zones in which said assigned seat is located.

4. The method according to claim 3, wherein said steps c) and d) are carried out by providing to said passenger a passenger ticket that displays said unique identifier and that displays said allocated one of said different colors or a text name of said allocated one of said different colors.

5. In an aircraft having a passenger cabin therein, with plural passenger seats arranged in successive seat rows in said passenger cabin,
   a system for assisting a passenger to find a respective assigned seat that is assigned to the passenger among said plural passenger seats, wherein:
   said passenger cabin includes plural cabin zones that are respectively identified by respective different colors of illumination assigned respectively to said cabin zones, and wherein each one of said cabin zones respectively includes a respective plurality of said seat rows of said passenger seats therein; and
   said system comprises plural lighting devices that are respectively allocated to and arranged in said plural cabin zones and that are respectively adapted to introduce visible illuminating light having said respective different colors of illumination into said plural cabin zones;
   wherein said passenger cabin is divided into plural cabin level-of-service classes; and
   wherein either:
   a) each one of said cabin zones corresponds with a respective one of said cabin level-of-service classes, or
   b) said cabin zones do not correspond directly one-to-one with said cabin level-of-service classes and at least one of said cabin level-of-service classes encompasses a plurality of said cabin zones respectively identified by different ones of said colors of illumination.

6. The system in the aircraft according to claim 5, wherein said aircraft further has fuselage sidewalls bounding sides of said passenger cabin and overhead baggage compartments arranged in said passenger cabin above said passenger seats in said plural cabin zones, and said lighting devices comprise lighting strips arranged extending longitudinally along said overhead baggage compartments, between said fuselage sidewalls and said overhead baggage compartments at said sides of said passenger cabin.

7. The system in the aircraft according to claim 5, wherein said aircraft further has ceiling trim panels bounding a top of said passenger cabin and overhead baggage compartments arranged in said passenger cabin above said passenger seats in said plural cabin zones, and said lighting devices comprise lighting strips arranged extending longitudinally along said overhead baggage compartments, between said ceiling trim panels, and said overhead baggage compartments.

8. The system in the aircraft according to claim 5, wherein said aircraft further has windows respectively surrounded by window trim funnels in fuselage sidewalls bounding said passenger cabin in said plural cabin zones, and said lighting devices are arranged on or in said window trim funnels.

9. The system in the aircraft according to claim 5, wherein said lighting devices comprise fluorescent light tubes and color filters having said different colors of illumination.

10. The system in the aircraft according to claim 5, wherein said lighting devices comprise light emitting diodes adapted to emit said illuminating light having said respective different colors of illumination.

11. The system in the aircraft according to claim 10, wherein a respective one of said lighting devices in one of said cabin zones comprises plural light emitting diodes respectively having plural different emission colors, and wherein a selected one or group of said light emitting diodes is adapted and connected to be selectively energizable to emit light having an overall color corresponding to a selected one of said colors of illumination in a respective one of said cabin zones.

12. The system in the aircraft according to claim 11, wherein said aircraft further has windows respectively surrounded by window trim funnels in fuselage sidewalls bounding said passenger cabin in said plural cabin zones, and said lighting devices are arranged on or in said window trim funnels.

13. The system in the aircraft according to claim 5, wherein said aircraft further has an electrical power supply system, a control arrangement, and a flight attendant control panel, and wherein said lighting devices are connected via said control arrangement to said electrical power supply system so that said lighting devices can be selectively energized individually or in groups in response to control selections input into said flight attendant control panel.

14. The system in the aircraft according to claim 5, wherein said each one of said cabin zones corresponds with a respective one of said cabin level-of-service classes.

15. The system in the aircraft according to claim 14, wherein each said cabin level-of-service class is respectively selected from the group consisting of first-class, business class, coach class, economy class, and tourist class.

16. The system in the aircraft according to claim 5, wherein said cabin zones do not correspond directly one-to-one with said cabin level-of-service classes, and said at least one of said cabin level-of-service classes encompasses said plurality of said cabin zones respectively identified by said different ones of said colors of illumination.

17. The system in the aircraft according to claim 5, further comprising a passenger ticket issued to the passenger, wherein said passenger ticket identifies said respective assigned seat that is assigned to the passenger and identifies a respective one of said different colors of illumination that is assigned to a respective one of said cabin zones in which said respective assigned seat is located.

18. The system in the aircraft according to claim 17, wherein said passenger ticket identifies said respective one of said different colors by displaying a text name of said respective one of said different colors.

19. The system in the aircraft according to claim 17, wherein said passenger ticket identifies said respective one of said different colors by displaying the color of said respective one of said different colors.

* * * * *